(No Model.)  2 Sheets—Sheet 2.
H. G. OSBURN.
INTERIOR CONDUIT FOR ELECTRICAL CONDUCTORS.
No. 590,374.  Patented Sept. 21, 1897.
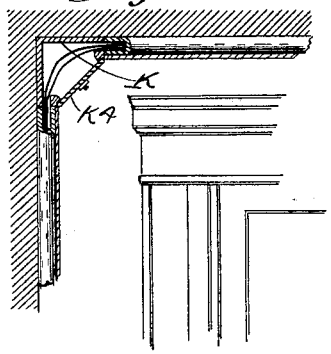
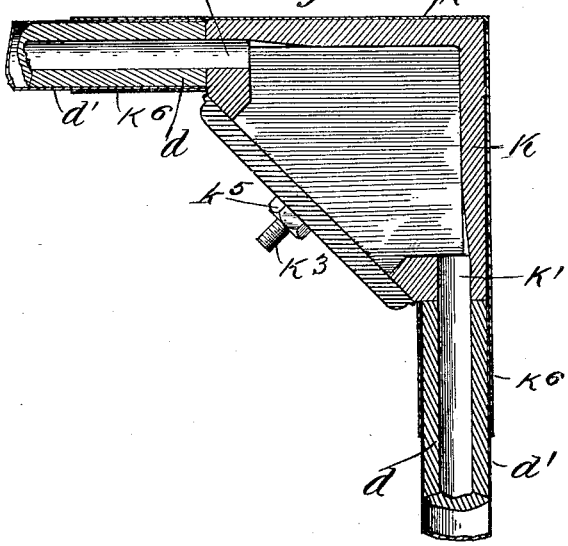
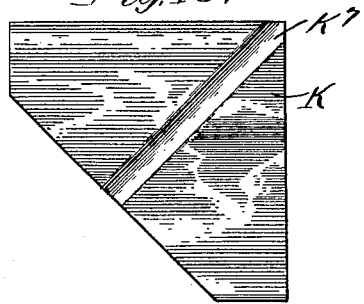
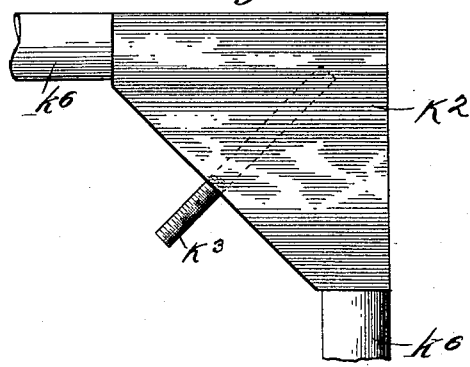
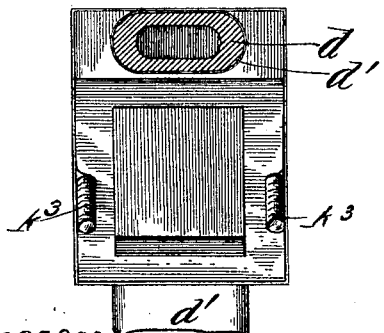
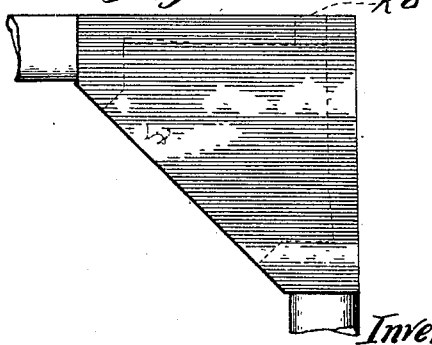
Witnesses,
D. W. C. Tanner.
George L. Cragg.
Inventor:
Harry G. Osburn,
By Barton & Brown
Attorneys.

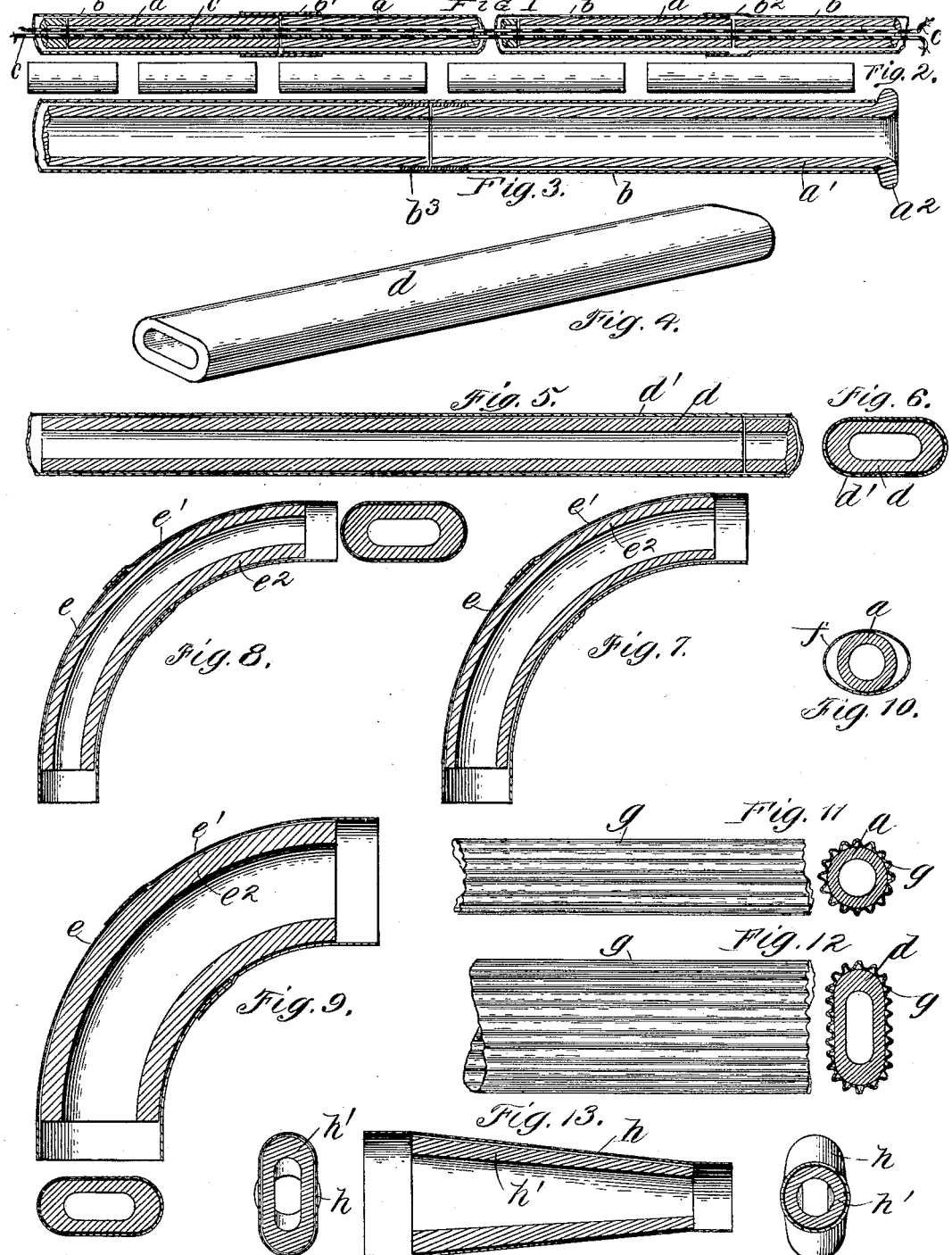

UNITED STATES PATENT OFFICE.

HARRY G. OSBURN, OF CHICAGO, ILLINOIS.

INTERIOR CONDUIT FOR ELECTRICAL CONDUCTORS.

SPECIFICATION forming part of Letters Patent No. 590,374, dated September 21, 1897.

Application filed March 23, 1896. Serial No. 584,463. (No model.)

*To all whom it may concern:*

Be it known that I, HARRY G. OSBURN, a citizen of the United States, residing at Chicago, in the county of Cook and State of Illinois, have invented a certain new and useful Improvement in Interior Conduits for Electrical Conductors, (Case No. 2,) of which the following is a full, clear, concise, and exact description, reference being had to the accompanying drawings, forming a part of this specification.

My invention relates to interior conduits for electrical conductors, its object being to provide conduits for the interior wiring of buildings which shall thoroughly protect and insulate the electrical conductors.

I provide a metal sheath or casing, preferably of sheet-steel, the casing being made in sections of, say, six to eight feet in length and joined together in any convenient manner, preferably by a metal sleeve adapted to engage the adjoining ends of two sections or by an enlargement or bell upon the end of one section adapted to inclose the end of an adjoining section. Within the sheet-metal casing are placed short tubes of insulating material, the tubes being usually about six inches in length and resting within the casing end to end. The metal casing is thus lined throughout with insulating material, which thoroughly insulates and protects the electrical conductors and prevents the same from being grounded by coming in contact with the metal casing.

The insulating-tubes are formed of stoneware, and the clay in being burned is thoroughly vitrified, thus imparting thereto a density that prevents the absorption of moisture and renders the tubes thoroughly insulating. The clay from which the tubes are formed is very silicious, and when fired becomes nonporous, due to the presence of the silex, the clay being vitrified throughout its entire substance. If clay possessing little or no silex be employed—such, for instance, as is commonly used for making the pottery known in the art as "earthenware"—a very porous structure results, which renders the material unsatisfactory for insulating purposes, as the porous material readily absorbs moisture, thus materially lowering the resistance of the insulating-tubes. It has been proposed to employ earthenware and to provide the same with a glazed surface, but this is objectionable, as the glazing is scaled off in handling, thus leaving porous surfaces exposed, through which moisture may penetrate to the whole of the tube.

A further advantage attained by thus employing stoneware is the much greater structural strength secured for the insulating-tubes, which in consequence are far better adapted for the purpose of interior-conduit work than are tubes formed of other materials. These stoneware tubes of six inches in length are not injured by being subjected to comparatively hard blows or by the shock of a fall through considerable distances, which would inevitably break tubes formed of glass or porcelain. When a stoneware insulating-tube is accidentally broken within the casing, the material does not shatter, but breaks squarely, leaving no sharp edges or fragments to cut or tear the insulation of the wires as the same are drawn through the conduit.

Stoneware is comparatively cheap and inexpensive, the cost thereof being quite low when compared with that of glass or porcelain, and tubes manufactured from this material may be very readily covered upon the interior or the exterior, or both, with a lead, salt, or other glaze, as is well known in the art, but the glaze is unnecessary when the tubes are sufficiently vitrified and is to a certain degree objectionable, as it increases the cost of the tubes and as a number of the tubes are broken in separating them where they have become molded together during the glazing operation.

The insulating-tubes are usually made of circular cross-section, except where it is desired to place the conduit against the surface of the wall and cover it with the plaster. To accommodate this, I form the insulating-tubes with an oval cross-section, the minor dimension being such that when the plaster is in position upon the wall the conduit lies beneath the surface of the plaster and is thus completely hidden from view.

Besides the general features of invention above referred to my invention comprehends certain details of construction hereinafter described and claimed.

I have illustrated my invention in connection with the accompanying drawings, in which—

Figure 1 is a sectional view of a conduit embodying my invention, showing two alternative means for securing the metal sheaths together. Fig. 2 is a view illustrating a number of supplemental insulating-tubes. Fig. 3 is a sectional view of a conduit in which the insulating-tube provided at the end of the metal casing or sheath is provided with a shoulder to prevent the conductors from coming in contact with the metal sheath. Fig. 4 is a perspective view of the flat or oval insulating-tube. Fig. 5 is a sectional view illustrating the same placed within a metal sheath. Fig. 6 is a view in cross-section of the flat insulating-tube and sheath. Fig. 7 is a view in cross-section of an elbow employed with tubes of circular cross-section. Fig. 8 is an elbow for use with the flat or oval insulating-tubes for making a bend in the plane of the minor dimension of the tubes. Fig. 9 is a view of an elbow for making a turn in the plane of the major dimension of the flat or oval tubes. Fig. 10 is a sectional view illustrating a flat or oval sheath or casing with an insulating-tube of circular cross-section therein. Fig. 11 is a view illustrating a sheath of circular cross-section provided with longitudinal corrugations for centering the insulating-tube and for affording a certain flexibility to the sheath to accommodate tubes of slightly-varying form and dimension. Fig. 12 is a similar view illustrating a sheath adapted for flat insulating-tubes and provided with longitudinal corrugations. Fig. 13 is a view of a union for uniting conduits having respectively oval and circular cross-section. Fig. 14 is a view of the corner of a room, illustrating one of the corner-boxes of my invention in position, together with the conduits leading thereto. Fig. 15 is a sectional view of the corner-box. Fig. 16 is a view of the stoneware interior of the corner-box. Fig. 17 is a view of the metal covering. Fig. 18 is a front view of the box, showing the cover removed. Fig. 19 is a view of a modification of the corner-box.

Like letters and numerals refer to like parts in the several figures.

As illustrated in Fig. 1, the short insulating-tubes $a\ a$ are placed end to end within the sheaths or casings $b\ b$ of sheet metal, preferably steel. These tubes, as stated in the preceding portion of this specification, are of stoneware, which usually are employed in an unglazed state. This material is characterized by its hardness and infusibility, being manufactured from highly-plastic clays very rich in silica, which vitrify during the firing and form a dense opaque body of great strength.

The tubes preferably are formed by strongly compressing the clay or paste in a damp state after milling and forcing the same through a die, the tubes subsequently being dried and fired at a white heat, which gives them their peculiar properties above mentioned. The clays adapted to the manufacture of these tubes consist principally of silica and alumina, the finer-grained and more plastic clays furnishing the most satisfactory body. With some natural clays it is found necessary to add silica thereto, together with a lime flux.

The tubes are capable of receiving either the salt or lead glaze peculiar to stoneware, which requires a paste having a large percentage of silica, although the material itself is vitreous enough to render the use of a glaze entirely unnecessary. These tubes are unaffected by extreme heat, which would fuse or soften porcelain and earthenware, while the stoneware of which said tubes are formed is not porous, as is the case with the latter material.

The casings $b$ may be secured together at the ends by means of a metal sleeve $b'$ fitting over the adjoining ends of the casings, or by means of a bell or enlargement $b^2$ upon the end of one of the casings adapted to inclose the end of the adjoining casing.

The electrical conductors $c\ c$ are passed through the interior of the insulating-tubes $a\ a$ and are thoroughly insulated and protected.

As it is often desired to cut off a greater or less portion of the casing to adapt the conduit to the locality in which it is placed, I provide a number of supplemental tubes (illustrated in Fig. 2) of one, two, three, four, and five inches in length, respectively. Should it be necessary to cut off, say, two inches from the end of the casing, the six-inch tube upon the end may be removed and a four-inch tube placed in position. Should it be necessary to cut off, say, three inches, a three-inch tube may be placed in the end of the casing. The insulating-tubes may thus completely fill the casing at whatever length it may be necessary to employ it.

In Fig. 3 I have illustrated an insulating-tube $a'$ inserted in the end of a casing $b$, the insulating-tube being provided with a laterally-extending shoulder $a^2$, which rests against the end of the metal casing and prevents the conductors extending from the end of the conduit from coming in contact with the metal casing. In some instances, particularly where the conduit is subjected to considerable moisture, I provide a sleeve or ferrule $b^3$, surrounding the ends of the insulating-tubes and situated within the metal casing. I may also employ for this purpose a cotton covering saturated with asphaltum. Moisture passing to the interior of the metal casing is thus prevented from passing to the interior of the insulating-tubes through the joints between the same.

In Figs. 4, 5, and 6 I have illustrated an insulating-tube $d$ of oval or flat cross-section inserted within a metal casing $d'$ of corresponding form. This form of conduit I find advantageous where it is desired to place the conduit upon the wall and beneath the plaster, the minor dimension of the conduit being such that the conduit lies wholly beneath the surface of the plaster, as illustrated in Fig. 14.

In Figs. 7, 8, and 9 I have shown forms of elbows which I employ, the metal casings being made in two sections $e$ $e'$, adapted to be connected together end to end. I find it desirable to thus construct the metal casings, as it oftentimes happens in the burning of the stoneware elbows that the ends of the insulating-tube $e^2$ become slightly out of line, and by making the casing in two sections the casing accommodates itself to elbows of somewhat varying form.

I find that in the burning of the insulating-tubes a large number of them become so bent or crooked as to prevent their insertion in a circular casing of but slightly larger dimension than the inclosed tube, and I have therefore in some instances employed a casing $f$ of elliptical or oval cross-section, as illustrated in Fig. 10, whereby crooked insulating-tubes which could not be inserted in a circular casing may be inserted into the oval casing. This particular form of conduit I have shown and specifically claimed in my pending application for United States Letters Patent, Serial No. 567,580, filed November 1, 1895.

In Figs. 11 and 12 I have illustrated a form of my invention wherein the metal casing $g$ is provided with longitudinal corrugations, whereby a certain flexibility is imparted to the casing, which permits the insertion of tubes not perfectly straight, while at the same time the corrugations serve to center the tubes within the sheaths.

Where it is desired to run the conduit upon the interior of the wall, I usually employ the conduit having the circular cross-section, and it is oftentimes necessary to change from the conduit with circular cross-section to the conduit with oval cross-section when it is desired to pass from the interior of the wall to the surface of the wall. In Fig. 13 I have illustrated a union provided with a casing $h$ and insulating-tube $h'$, which have a circular cross-section at one end and an oval or elliptical cross-section at the other end, whereby it may be joined to conduits of the two forms above mentioned.

When the conduits are placed upon the surface of a wall and beneath the plaster, the employment of an elbow in passing from one surface to another surface perpendicular thereto is objectionable, as the elbow would necessarily project a considerable distance into the room. For such locations I provide a corner-box, which rests in the corner and is provided with a cover, which may be removed to permit access to the interior of the box. Connections between the conductors may be made within the box and are thus readily accessible at all times. Furthermore, the employment of the boxes facilitates the fishing of the wires through the conduits and permits access to the wires at any time for purposes of repair or for rewiring the building. The body of the corner-box $k$ is formed of the same stoneware material as that from which the insulating-tubes are formed and is provided with openings $k'$ $k'$ at right angles to permit the passage of the conductors to the interior of the box.

A metal casing $k^2$ is provided, which fits over the exterior of the box and carries, soldered or otherwise secured to the interior face, the threaded rods $k^3$ $k^3$. A cover $k^4$, of similar stoneware material, is provided with openings and the cover is placed in position with the rods $k^3$ extending through the openings, after which the nuts $k^5$ may be screwed upon the ends of the rods $k^3$ to secure the cover in position. Short metal tubes $k^6$ $k^6$ are mounted upon the casing $k^2$, and the sheaths or metal casings $d'$ extend within the tubes $k^6$, the insulating-tubes $d$ resting by their ends against the body $k'$ of the box. The conductors are passed into the box through one of the conduits and from the box through the opposite conduit, the conductors being readily accessible by the removal of the cover $k^4$. After the corner-box and the conduits have been placed in position the plaster may be placed upon the wall, as illustrated in Fig. 14. Channels $k^7$ are provided upon the opposite sides of the body $k$ of the corner-box to accommodate the rods $k^3$.

In Fig. 19 I have illustrated a modification in which a third opening $k^8$ extends from the corner-box to permit the passage therefrom of conductors, where, for instance, it is desired to provide conductors extending through the wall or through the ceiling to the floor above.

Having described my invention, what I claim as new, and desire to secure by Letters Patent, is—

1. As a new article of manufacture, stoneware insulating-tubes formed in short lengths from clay suitable for the manufacture of such ware, the said clay containing large percentages of silica and alumina and being strongly compressed when being given tubulate form, the tubes thereafter being fired at a high temperature and thoroughly vitrified throughout, whereby high insulating properties and great structural strength are imparted to said tubes, substantially as described.

2. In an interior conduit, the combination with an external sheathing or casing, of short stoneware insulating-tubes disposed therein, end to end, the said tubes being formed of clay containing large percentages of silica and alumina suitable for the manufacture of such ware, the said clay being strongly compressed when given tubulate form and afterward fired at a high temperature until thoroughly vitrified throughout, whereby high insulating properties and great structural strength are imparted to said tubes, substantially as described.

3. In an interior conduit the combination with insulating-tubes of an outer casing or sheath inclosing said tubes the walls of said casing being formed to give them a spring-like action whereby the casing adapts itself to tubes slightly irregular in form or size, substantially as described.

4. In an interior conduit the combination with short lengths of insulating-tube of an inclosing sheath or casing in which said tubes are placed end to end, the walls of said casing being provided with inwardly-extending corrugations engaging said tubes whereby the same are centered and irregularity, in the form of the tubes is compensated, substantially as described.

5. In an interior conduit, the combination with sheet-metal sheaths or casings provided with longitudinal corrugations and means for securing the same together end to end, of short insulating-tubes within said casings and resting end to end, substantially as described.

6. In an interior conduit, the combination with an elbow of insulating material, of a sheet-metal sheath or casing for said elbow, said casing being made in two halves adapted to be secured together at the adjoining ends, substantially as and for the purpose set forth.

7. In an interior conduit the combination with short tubes adapted to contain electrical conductors of a casing or sheath for said tubes, the walls of which are provided with inwardly-extending depressions or corrugations whereby the tubes are centered within the casing and irregularity in their form compensated, substantially as described.

8. The combination in an interior conduit with a sheath or casing of tubes disposed within said casing and a covering or union for the ends of said tubes whereby the same are joined and moisture is excluded from their interior, substantially as described.

9. In a union for interior conduits, the combination with an insulating-tube of circular cross-section at one end and oval or elliptical cross-section at the opposite end, of a sheet-metal sheath or casing inclosing said insulating-tube, said casing being of circular cross-section at one end and of oval or elliptical cross-section at the opposite end, substantially as described.

10. As a new article of manufacture, a corner-box, for interior wiring, having a body provided with plane faces to conform to the intersecting walls against which the box is to be placed, openings at the opposite corners for the passage of wires from conduits lying against the walls, and a removable cover for permitting access to the interior of the box; substantially as described.

11. In a corner-box, the combination with a hollow body of insulating material having a removable cover and plane sides to conform to the intersecting walls, openings being provided at the opposite corners for the passage of the electrical conductors, of a sheet-metal casing inclosing said body of insulating material and provided at the corners with projecting sheet-metal tubes, adapted to rest against the walls, and conduits, the ends thereof resting within said projecting tubes and provided upon the interior with insulating-tubes adapted to abut against the body of insulating material within the casing, substantially as described.

12. In an interior conduit, the combination with a sheet-metal sheath or casing, of short insulating-tubes within said casing resting end to end, and a sleeve or wrapping surrounding the contiguous ends of adjoining insulating-tubes, substantially as described.

13. In an interior conduit the combination with a sheath or casing of short insulating-tubes within said casing and a union or sleeve provided within the casing joining the ends of the insulating-tubes whereby moisture is excluded from the conductors contained in said tubes, substantially as described.

14. In an interior conduit the combination with an insulating-tube and a casing therefor of another insulating-tube and casing differing from the former in cross-section and a union for the above adapted to join the same in a single conduit consisting of an insulating-tube and casing therefor the ends of which respectively conform to the ends of the tubes and casings of different cross-section, substantially as described.

In witness whereof I hereunto subscribe my name this 18th day of March, A. D. 1896.

HARRY G. OSBURN.

Witnesses:
CHARLES R. BROWN,
JOHN W. SINCLAIR.